(12) United States Patent
Lyons et al.

(10) Patent No.: US 10,677,161 B2
(45) Date of Patent: Jun. 9, 2020

(54) GAS TURBINE ENGINE DIFFUSER COOLING AND MIXING ARRANGEMENT

(71) Applicant: United Technologies Corporation, Farmington, CT (US)

(72) Inventors: Christopher B. Lyons, West Hartford, CT (US); Albert K. Cheung, East Hampton, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 447 days.

(21) Appl. No.: 14/913,922

(22) PCT Filed: Jul. 18, 2014

(86) PCT No.: PCT/US2014/047143
§ 371 (c)(1),
(2) Date: Feb. 23, 2016

(87) PCT Pub. No.: WO2015/030948
PCT Pub. Date: Mar. 5, 2015

(65) Prior Publication Data
US 2016/0201688 A1    Jul. 14, 2016

Related U.S. Application Data

(60) Provisional application No. 61/870,942, filed on Aug. 28, 2013.

(51) Int. Cl.
*F02C 6/08*       (2006.01)
*F01D 5/08*       (2006.01)
(Continued)

(52) U.S. Cl.
CPC ............... *F02C 6/08* (2013.01); *F01D 5/081* (2013.01); *F01D 9/065* (2013.01); *F01D 25/125* (2013.01);
(Continued)

(58) Field of Classification Search
CPC ....... Y02T 50/675; F01D 25/12; F01D 5/081; F01D 5/082; F01D 5/08; F01D 5/12;
(Continued)

(56) References Cited

U.S. PATENT DOCUMENTS 4,355,507 A    10/1982  Coffey et al.
4,416,111 A *  11/1983  Lenahan ................... F02C 7/18
                                                    415/115

(Continued)

FOREIGN PATENT DOCUMENTS

WO        2015023342        2/2015

OTHER PUBLICATIONS

Supplementary European Search Report for European Application No. 14839670.8 dated Mar. 23, 2017.
(Continued)

*Primary Examiner* — Ehud Gartenberg
*Assistant Examiner* — James P McGlynn
(74) *Attorney, Agent, or Firm* — Carlson, Gaskey & Olds, P.C.

(57) ABSTRACT

A diffuser for a gas turbine engine includes a diffuser housing that has a circumferential array of hollow struts that provide a cavity. The diffuser housing includes inlet and outlet apertures that are in fluid communication with the cavity. An opening on a trailing end of the struts is in fluid communication with the cavity. The diffuser housing is configured to introduce a fluid through the inlet aperture and receive a core flow through the opening. The fluid and core flow exit through the outlet aperture.

17 Claims, 3 Drawing Sheets

(51) Int. Cl.
*F01D 25/12* (2006.01)
*F02C 7/18* (2006.01)
*F04D 29/54* (2006.01)
*F02C 6/06* (2006.01)
*F01D 9/06* (2006.01)

(52) U.S. Cl.
CPC ............ *F02C 7/185* (2013.01); *F04D 29/542* (2013.01); *F01D 5/082* (2013.01); *F02C 6/06* (2013.01); *F05D 2220/3219* (2013.01); *F05D 2240/122* (2013.01); *Y02T 50/676* (2013.01)

(58) Field of Classification Search
CPC ........ F01D 9/065; F01D 17/105; F01D 25/14; F01D 25/125; F01D 2260/20; F02C 7/141; F02C 9/18; F02C 6/06; F02C 7/185; F02C 7/18; F02C 6/08; F04D 29/542; F04D 29/584; F04D 29/5846
See application file for complete search history.

(56) References Cited

U.S. PATENT DOCUMENTS

| | | | | |
|---|---|---|---|---|
| 4,561,246 | A * | 12/1985 | Hovan | F01D 25/125 165/51 |
| 4,822,244 | A | 4/1989 | Maier et al. | |
| 4,918,926 | A * | 4/1990 | Nikkanen | F23R 3/04 60/751 |
| 5,297,386 | A * | 3/1994 | Kervistin | F01D 11/24 415/115 |
| 5,632,141 | A * | 5/1997 | Sloop | F01D 17/105 60/751 |
| 5,680,767 | A | 10/1997 | Lee et al. | |
| 6,035,627 | A * | 3/2000 | Liu | F02C 7/185 415/176 |
| 6,050,079 | A | 4/2000 | Durgin et al. | |
| 6,183,193 | B1 | 2/2001 | Glasspoole et al. | |
| 6,334,297 | B1 * | 1/2002 | Dailey | F23R 3/04 60/751 |
| 6,401,447 | B1 * | 6/2002 | Rice | F23M 5/04 60/751 |
| 6,612,114 | B1 | 9/2003 | Klingels | |
| 6,722,138 | B2 * | 4/2004 | Soechting | F02C 7/18 60/785 |
| 7,001,075 | B2 * | 2/2006 | Bradshaw | F01D 9/065 384/134 |
| 7,574,864 | B2 | 8/2009 | Tiemann | |
| 2007/0059158 | A1 | 3/2007 | Alvanos et al. | |
| 2012/0057967 | A1 | 3/2012 | Laurello et al. | |
| 2012/0321453 | A1 | 12/2012 | Alvanos | |
| 2013/0000305 | A1 | 1/2013 | Smith | |
| 2014/0037231 | A1 | 2/2014 | Hawbaker | |
| 2014/0178174 | A1 | 6/2014 | Caprario et al. | |
| 2015/0247424 | A1 | 9/2015 | Schwarz et al. | |

OTHER PUBLICATIONS

International Search Report and Written Opinion for PCT/US2014/047143 dated Nov. 4, 2014.
International Preliminary Report on Patentability for PCT Application No. PCT/US2014/047143, dated Mar. 10, 2016.

* cited by examiner

GAS TURBINE ENGINE DIFFUSER COOLING AND MIXING ARRANGEMENT

CROSS-REFERENCE TO RELATED APPLICATIONS

This application claims priority to U.S. Provisional Application No. 61/870,942, which was filed on Aug. 28, 2013.

STATEMENT REGARDING FEDERALLY SPONSORED RESEARCH OR DEVELOPMENT

This invention was made with government support under Contract No. FA8650-09-D-2923 awarded by the United States Air Force. The Government has certain rights in this invention.

BACKGROUND

This disclosure relates to an upstream portion of a diffuser sometimes referred to as a "pre-diffuser." More particularly, the disclosure relates to struts on the pre-diffuser and fluid flow therethrough.

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section.

Historically, a fan in the fan section was driven at the same speed as a turbine within the turbine section. More recently, it has been proposed to include a gear reduction between the fan section and a fan drive turbine. With this change, the diameter of the fan has increased dramatically and a bypass ratio or volume of air delivered into the bypass duct compared to a volume delivered into the compressor has increased. With this increase in bypass ratio, it becomes more important to efficiently utilize the air that is delivered into the compressor section.

One factor that increases the efficiency of the use of this air is to have a higher pressure at the exit of a high pressure compressor. This high pressure results in a high temperature increase. The temperature at the exit of the high pressure compressor is known as $T_3$ in the art. T3 air is sometimes used to cool the turbine section, for example, through a tangential on-board injector (TOBI), as well as provide air for other uses in the engine. Due to the increased $T_3$ temperature, super-cooled fluid from a heat exchanger has instead been provided to the TOBI and other engine areas.

SUMMARY

In one exemplary embodiment, a diffuser for a gas turbine engine includes a diffuser housing that has a circumferential array of hollow struts that provide a cavity. The diffuser housing includes inlet and outlet apertures that are in fluid communication with the cavity. An opening on a trailing end of the struts is in fluid communication with the cavity. The diffuser housing is configured to introduce a fluid through the inlet aperture and receive a core flow through the opening. The fluid and core flow exit through the outlet aperture.

In a further embodiment of the above, the diffuser housing includes inner and outer flow path surfaces joined by the struts and configured to provide a core flow path for the core flow.

In a further embodiment of any of the above, the diffuser housing includes an inner diffuser case and an outer diffuser case, and comprises a combustor that is secured to the diffuser housing between the inner and outer diffuser case and downstream from the struts.

In a further embodiment of any of the above, the opening faces the combustor.

In a further embodiment of any of the above, a tube extends through the diffuser housing into the strut cavity through the inlet aperture. The tube is configured to provide the fluid.

In a further embodiment of any of the above, a seal is provided between the tube and the diffuser.

In a further embodiment of any of the above, the outlet aperture is arranged radially inward of the inlet aperture.

In a further embodiment of any of the above, the trailing end has a generally flat face, and the opening is provided in the face.

In another exemplary embodiment, a gas turbine engine includes a compressor section and a turbine section that are configured to receive a core flow. A combustor section is fluidly arranged between the compressor and turbine sections. A diffuser is arranged fluidly between the compressor section and the combustor section. The diffuser has a circumferential array of hollow struts that provide a cavity. The diffuser includes inlet and outlet apertures that are in fluid communication with the cavity. An opening on a trailing end of the struts is in fluid communication with the cavity. The diffuser is configured to introduce a fluid through the inlet aperture and receive the core flow through the opening. The fluid and core flow exit through the outlet aperture.

In a further embodiment of any of the above, the diffuser includes a diffuser housing that is secured to a combustor. A mixture of the fluid and the core flow is configured to be provided to an exterior of the combustor.

In a further embodiment of any of the above, a TOBI module is arranged downstream from the strut. The TOBI module is configured to receive a mixture of the fluid and the core flow.

In a further embodiment of any of the above, there is a bearing compartment. The bearing compartment is configured to receive a mixture of the fluid and the core flow.

In a further embodiment of any of the above, a tube extends through the diffuser into the strut cavity through the inlet aperture. The tube is configured to provide the fluid.

In a further embodiment of any of the above, the opening faces the combustor.

In a further embodiment of any of the above, the outlet aperture is arranged radially inward of the inlet aperture.

In a further embodiment of any of the above, the trailing end has a generally flat face, and the opening is provided in the face.

In another exemplary embodiment, a method of supplying fluid to a gas turbine engine diffuser, includes the steps of introducing a fluid to a strut cavity, introducing a core flow to the strut cavity, and mixing the fluid and the core flow to provide mixed fluid to at least one of a bearing and an inner diffuser case.

In a further embodiment of the above, the fluid introducing step includes providing a compressor bleed air to the strut cavity.

In a further embodiment of any of the above, the core flow introducing step includes flowing fluid through a trailing end of a strut providing the strut cavity that faces a combustor.

In a further embodiment of any of the above, includes the step of providing a mixture of the fluid and the core flow to a TOBI module.

BRIEF DESCRIPTION OF THE DRAWINGS

The disclosure can be further understood by reference to the following detailed description when considered in connection with the accompanying drawings wherein.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

Figure 1:
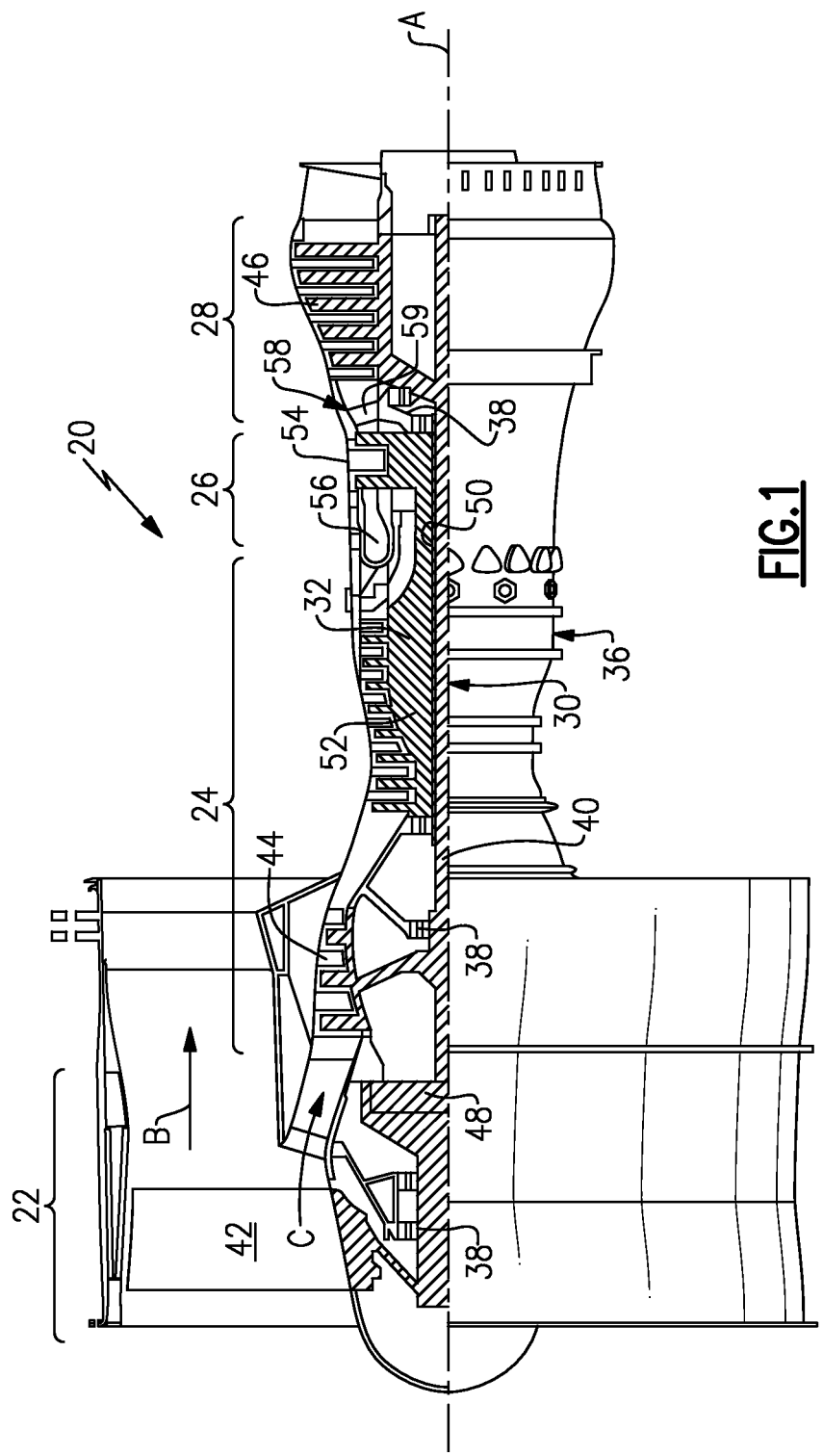
FIG. 1 is a schematic view of an example gas turbine engine including a combustor.
Figure 2:
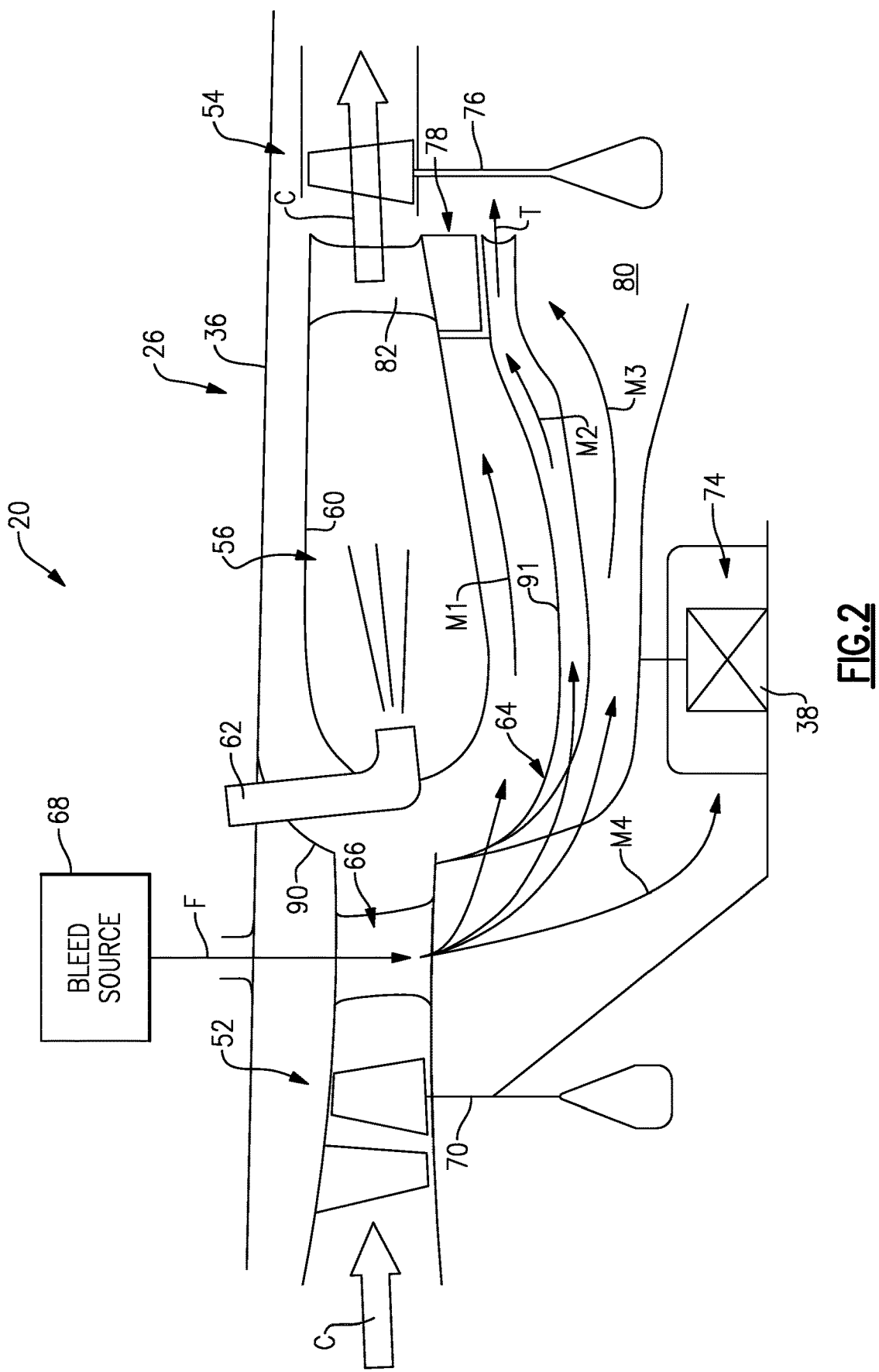
FIG. 2 is an enlarged schematic view of a gas turbine engine in the area of the combustor and a diffuser.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flowpath B while the compressor section 24 drives air along a core flowpath C (as shown in FIG. 2) for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 supports one or more bearing systems 38 in the turbine section 28. The inner shaft 40 and the outer shaft 50 are concentric and rotate via bearing systems 38 about the engine central longitudinal axis A, which is collinear with their longitudinal axes.

The core airflow C is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example a high-bypass geared aircraft engine. In a further example, the engine 20 bypass ratio is greater than about six (6), with an example embodiment being greater than ten (10). The example speed reduction device is a geared architecture 48 however other speed reducing devices such as fluid or electromechanical devices are also within the contemplation of this disclosure. The example geared architecture 48 is an epicyclic gear train, such as a star gear system or other gear system, with a ratio of greater than about 2.3, or more specifically, a ratio of from about 2.2 to about 4.0. In one disclosed embodiment, the engine 20 bypass ratio is greater than about ten (10:1), the fan diameter is significantly larger than that of the low pressure compressor 44, and the low pressure turbine 46 has a pressure ratio that is greater than about 5:1. Low pressure turbine 46 pressure ratio is pressure measured prior to inlet of low pressure turbine 46 as related to the pressure at the outlet of the low pressure turbine 46 prior to an exhaust nozzle. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass of the engine 20 is designed for a particular flight condition—typically cruise at about 0.8 Mach and about 35,000 feet. The flight condition of 0.8 Mach and 35,000 ft, with the engine at its best fuel consumption—also known as bucket cruise Thrust Specific Fuel Consumption ("TSFC"). TSFC is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(T_{ambient} °R)/518.7° R)^{0.5}]$. The "Low corrected fan tip speed" as disclosed herein according to one non-limiting embodiment is less than about 1150 ft/second.

An area of the combustor section 26 is shown in more detail in FIG. 2. The combustor section 26 includes a combustor 56 having a combustor housing 60. An injector 62 is arranged at a forward end of the combustor housing 60 and is configured to provide fuel to the combustor housing 60 where it is ignited to produce hot gases that expand through the turbine section 54.

A diffuser includes a diffuser housing 64 secured to the combustor housing 60, which forms a diffuser plenum surrounding the combustor housing 60. The diffuser housing 64 and combustor housing 60 are fixed relative to the engine static structure 36. The diffuser housing 64 includes a portion arranged downstream from the compressor section 52 and upstream from the combustor section 26 that is sometimes referred to as a "pre-diffuser" 66 A bleed source 68, such as fluid from a compressor stage, provides cooling fluid F through the pre-diffuser 66 to various locations within the gas turbine engine 20. A heat exchanger (not shown) may be used to cool the cooling fluid F before entering the pre-diffuser 66.

The compressor section 52 includes a compressor rotor 70 supported for rotation relative to the engine static structure 36 by the bearing 38. The bearing 38 is arranged within a bearing compartment 74. The turbine section 54 includes a turbine rotor 76 arranged downstream from a TOBI module 78. The TOBI module 78 supports a circumferential array of vanes 82 that are arranged upstream from the turbine rotor 76. The vanes 82 provide the first fixed stator stage of the turbine section 54.

Figure 3:
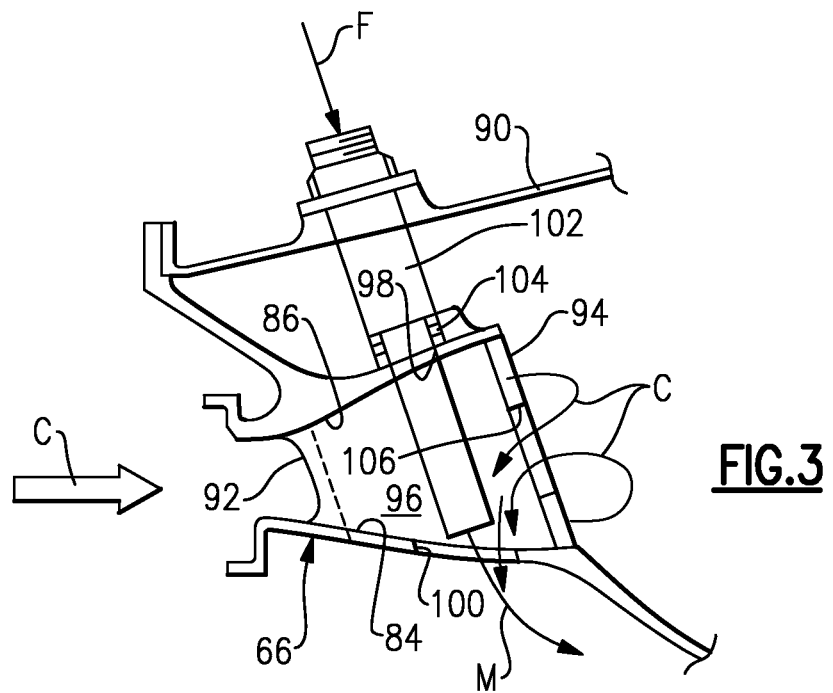
FIG. 3 is an enlarged cross-sectional view of the diffuser shown in FIG. 2.
Figure 4:
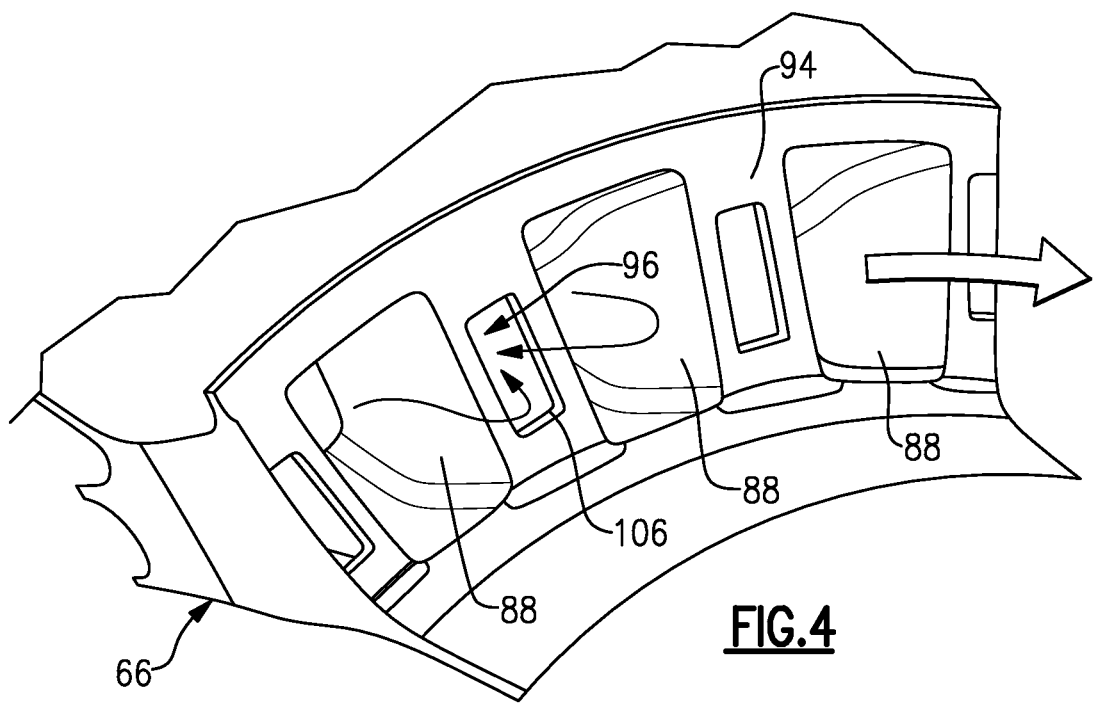
FIG. 4 is an enlarged perspective view of an aft portion of the diffuser shown in FIG. 3.

The pre-diffuser 66 distributes fluid to the diffuser housing 64, the TOBI module 78 and other areas of the engine 20. The pre-diffuser 66 includes a circumferential array of hollow struts 88, as shown in FIGS. 3 and 4, which provide exit vanes to the compressor section. The exit vanes may also be provided as separate structures from the struts, if desired. For this reason, terms "struts" and "exit vanes" should be understood as being interchangeable in this disclosure. The diffuser housing 64 provides inner and outer flow path surfaces 84, 86 that are joined to one another by the struts 88. The core flow C passes circumferentially between the struts 88. An outer diffuser case 90 and an inner case 91 are supported by the pre-diffuser 66. It should be understood that the diffuser case structure and engine static structure are typically provided by one or more components secured to one another to facilitate assembly.

The struts 88 include leading and trailing ends 92, 94. In one example, the trailing end 94 is provided by a generally flat face. The struts 88 are hollow and provide a cavity 96. First and second apertures 98, 100, which respectively provide inlets and outlets, are in fluid communication with the cavity 96. The fluid F is provided to the cavity 96 through the first aperture 98. In one example, a tube 102 extends through the outer diffuser case 90 and into the cavity 96 to provide the fluid F. A seal 104 may be provided between the diffuser 96 and the tube 102. Other structures, such as a manifold, may be used to deliver the fluid F to the cavity 96.

An opening 106 is provided in the trailing end 94 to introduce core flow C into the cavity 96. The core flow C is at a relatively high pressure and temperature as compared to the fluid F. The temperature of the fluid F is significantly reduced in pressure and temperature as compared to the core flow C. As such, the core flow C is forced from the area adjacent the trailing end 94 through the opening 106 and into the cavity 96. The introduction of the core flow C induces rapid mixing. The core flow C and the fluid F is mixed to provide a mixed fluid M having a temperature that is higher than the fluid F temperature.

The fluid F is distributed to various locations within the gas turbine engine 20 for a variety of uses. In one example, the mixed fluid M provides cooling fluid M1 supplied to an area between the combustor housing 60 and the diffuser housing 64. A cooling fluid M2 is supplied to the TOBI module 78 to supply TOBI air T for cooling the turbine rotor 76. A fluid M3 is supplied to a cavity 80 forward of the turbine rotor 76 to an air seal (not shown) in that region, and a fluid M4 is provided to air seals (not shown) in the area of the bearing compartment 74 to maintain lubrication oil within the bearing compartment 74.

The fluid F is heated by the core flow C, which protects various engine components, for example, the inner diffuser case 91, from thermal gradients that can reduce component life.

It should also be understood that although a particular component arrangement is disclosed in the illustrated embodiment, other arrangements will benefit herefrom. Although particular step sequences are shown, described, and claimed, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples.

Although an example embodiment has been disclosed, a worker of ordinary skill in this art would recognize that certain modifications would come within the scope of the claims. For that reason, the following claims should be studied to determine their true scope and content.

What is claimed is:

1. A diffuser for a gas turbine engine comprising:
a diffuser housing having a circumferential array of hollow struts providing a cavity, the diffuser housing including an inlet aperture and an outlet aperture in fluid communication with the cavity, and an opening in a trailing end of the hollow struts in fluid communication with the cavity, the diffuser housing configured to introduce a fluid through the inlet aperture and receive a core flow through the opening, the fluid being supplied from a compressor stage and routed through an outer diffuser case to the inlet aperture, the fluid and the core flow mixing and exiting through the outlet aperture, wherein the diffuser housing includes an inner flow path surface and an outer flow path surface joined by the hollow struts and configured to provide a core flow path for the core flow, the opening arranged radially between the inner flow path surface and the outer flow path surface.

2. The diffuser according to claim 1, wherein the diffuser housing includes an inner diffuser case and the outer diffuser case, and comprising a combustor secured to the diffuser housing between the inner diffuser case and the outer diffuser case and downstream from the hollow struts.

3. The diffuser according to claim 2, wherein the opening faces the combustor.

4. The diffuser according to claim 1, comprising a tube extending through the diffuser housing into the cavity through the inlet aperture, the tube configured to provide the fluid.

5. The diffuser according to claim 4, comprising a seal provided between the tube and the diffuser housing.

6. The diffuser according to claim 1, wherein the outlet aperture is arranged radially inward of the inlet aperture.

7. The diffuser according to claim 1, wherein the trailing end has a generally flat face, and the opening is provided in the generally flat face.

8. A gas turbine engine comprising:
a compressor section and a turbine section configured to receive a core flow;
a combustor section fluidly arranged between the compressor section and the turbine section; and
a diffuser arranged fluidly between the compressor section and the combustor section, the diffuser having a circumferential array of hollow struts providing a cavity, the diffuser including an inlet aperture and an outlet aperture in fluid communication with the cavity, and an opening in a trailing end of the hollow struts in fluid communication with the cavity, the diffuser configured to introduce a fluid through the inlet aperture and receive the core flow through the opening, the fluid being supplied from a compressor stage and routed through an outer diffuser case to the inlet aperture, the fluid and the core flow mixing and exiting through the outlet aperture, wherein the diffuser includes an inner flow path surface and an outer flow path surface joined by the hollow struts and configured to provide a core flow path for the core flow, the opening arranged radially between the inner flow path surface and the outer flow path surface.

9. The gas turbine engine according to claim 8, wherein the diffuser includes a diffuser housing secured to a combustor, and a mixture of the fluid and the core flow is configured to be provided to an exterior of the combustor.

10. The gas turbine engine according to claim 8, comprising a TOBI module arranged downstream from the hollow struts, the TOBI module configured to receive a mixture of the fluid and the core flow.

11. The gas turbine engine according to claim 8, comprising a bearing compartment, the bearing compartment configured to receive a mixture of the fluid and the core flow.

12. The gas turbine engine according to claim 8, comprising a tube extending through the diffuser into the cavity through the inlet aperture, the tube configured to provide the fluid.

13. The gas turbine engine according to claim 8, wherein the opening faces the combustor section.

14. The gas turbine engine according to claim 8, wherein the outlet aperture is arranged radially inward of the inlet aperture.

15. The gas turbine engine according to claim 8, wherein the trailing end has a generally flat face, and the opening is provided in the generally flat face.

16. A method of supplying a fluid to a gas turbine engine diffuser, comprising the steps of:
   providing a diffuser housing having a strut;
   introducing the fluid to a strut cavity through an inlet aperture;
   introducing a core flow to the strut cavity through an opening in a trailing end of the strut providing the strut cavity that faces a combustor, the fluid being supplied from a compressor stage and routed through an outer diffuser case to the inlet aperture;
   providing the diffuser housing with an inner flow path surface and an outer flow path surface joined by the strut, and configured to provide a core flow path for the core flow, the opening arranged radially between the inner flow path surface and the outer flow path surface; and
   mixing the fluid and the core flow to provide a mixed fluid to at least one of a bearing and an inner diffuser case via an outlet aperture in the diffuser housing.

17. The method according to claim 16, comprising the step of providing the mixed fluid to a TOBI module.

* * * * *